United States Patent
Wisniewski et al.

(10) Patent No.: US 8,991,902 B2
(45) Date of Patent: Mar. 31, 2015

(54) VEHICLE HOOD ASSEMBLY

(71) Applicant: GM Global Technology Operations LLC, Detroit, MI (US)

(72) Inventors: Chris James Tadeusz Wisniewski, Oshawa (CA); Jenne-Tai Wang, Rochester, MI (US); Bingbing Nie, Beijing (CN); Qing Zhou, Beijing (CN); Rajendra Prasad Krishnappa, Bangalore (IN); Jisi Tang, Beijing (CN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/950,780

(22) Filed: Jul. 25, 2013

(65) Prior Publication Data
US 2015/0028624 A1 Jan. 29, 2015

(51) Int. Cl.
B62D 25/10 (2006.01)
B62D 25/12 (2006.01)

(52) U.S. Cl.
CPC ..................................... *B62D 25/12* (2013.01)
USPC ................................. 296/187.04; 296/193.11

(58) Field of Classification Search
USPC .............. 296/193.11, 187.03, 187.04, 187.09
See application file for complete search history.

(56) References Cited

U.S. PATENT DOCUMENTS

| 7,354,101 | B2 | 4/2008 | Donabedian et al. |
| 7,635,157 | B2 | 12/2009 | Wang et al. |
| 7,690,720 | B2 | 4/2010 | Wang et al. |
| 7,735,908 | B2 | 6/2010 | Wang et al. |
| 8,356,857 | B2 * | 1/2013 | Ralston et al. ........... 296/187.04 |

* cited by examiner

*Primary Examiner* — Joseph D Pape
(74) *Attorney, Agent, or Firm* — Quinn Law Group, PLLC (57) ABSTRACT

A vehicle hood assembly includes a first panel member, a second panel member, and a third panel member disposed between the first panel member and the second panel member. The third panel member includes a corrugated body. The third panel member defines a plurality of panel perforations extending through the corrugated body in order to attenuate kinetic energy imparted to the hood assembly.

20 Claims, 5 Drawing Sheets

VEHICLE HOOD ASSEMBLY

TECHNICAL FIELD

The present invention relates generally to vehicle front structures, and more specifically to energy-absorbing engine compartment hoods.

BACKGROUND

Automotive vehicle bodies are typically constructed using stamped metal panels, which combine substantial overall strength and stiffness with a smooth, paintable exterior surface. With specific regard to vehicle hood panels (also referred to in the art as engine compartment hoods or bonnet structures), panel stiffness is often satisfied via the combination of a relatively high strength stamped metal outer or upper surface, referred to as an "A-surface", coupled with a preformed inner or lower surface, referred to as a "B-surface", supported by a series of engine-side or hat-section reinforcements. The hat-section reinforcements are typically positioned between the A- and B-surfaces of the hood, and include a pair of upper flanges oriented toward the A-surface as well as a single lower flange oriented toward the B-surface, with the upper and lower flanges interconnected by a web portion.

SUMMARY

The present disclosure relates to vehicle hood assemblies. In an embodiment, the vehicle hood assembly includes a first panel member, a second panel member, and a third panel member disposed between the first panel member and the second panel member. The third panel member includes a corrugated body. The third panel member defines a plurality of panel perforations extending through the corrugated body in order to attenuate kinetic energy imparted to the hood assembly.

The panel perforations may be substantially equidistantly spaced apart from one another. The third panel member may include a central panel region without panel perforations. The third panel member may include ribs to enhance stiffness of the third panel member. The ribs may be located in the central panel region. The second panel member may include a support plate configured to support the corrugated body. The support member defines a plurality of support perforations extending through the support plate. The second panel member may include a panel portion coupled to the support plate and defines a plurality of holes extending through the panel portion. The second panel member may include a panel portion monolithically formed with the support plate and defines a plurality of holes extending through the panel portion. The third panel member may entirely cover the support plate. The third panel member may only partially cover the support plate. The support plate may be substantially flat. The second panel member may include a plurality of beams configured to support the corrugated body. Each of the beams may have a substantially trapezoidal cross-section.

The present disclosure also relates to vehicles. In an embodiment, the vehicle includes a vehicle body, a hood assembly movably coupled to the vehicle body. The hood assembly defines a first edge and a second edge opposite the first edge. The hood assembly includes a first panel member, a second panel member, a third panel member coupled between the first panel member and the second panel member. The third panel member includes a corrugated body. The corrugated body defines a waveform profile propagating in a longitudinal direction from the first edge toward the second edge. The third panel member defines a plurality of panel perforations extending through the corrugated body in order to attenuate kinetic energy imparted to the hood assembly. The second panel member includes a substantially flat support plate configured to support the corrugated body. The second panel member may define a plurality of support perforations extending through the support plate. The support plate may include a central support region without support perforations or holes. The third panel member may entirely cover the support plate. The third panel member only partially covers the support plate. The support perforations may have different sizes. The vehicle may further include adhesive strips coupling the first panel member to the third panel member.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
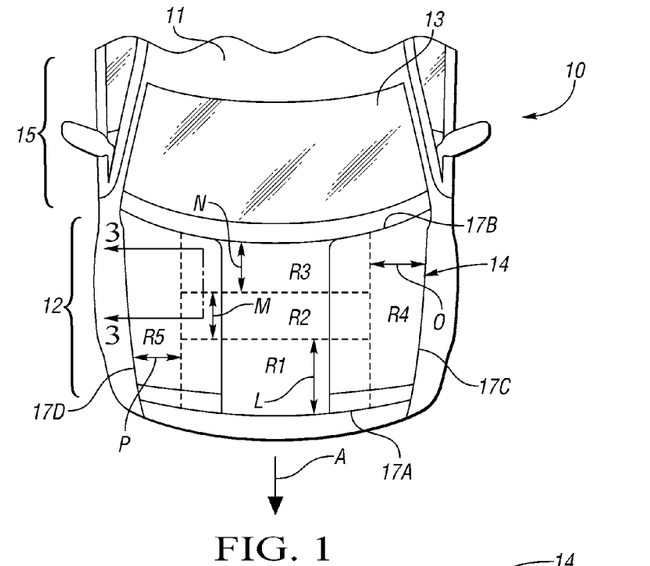
FIG. 1 is a schematic top sectional view of a vehicle including a hood assembly in accordance with an embodiment of the present disclosure.

Referring to the figures, wherein like reference numbers refer to like components throughout the several views, FIG. 1 is a plan view of an exemplary motor vehicle, identified generally as 10. FIG. 1 is provided merely for explanatory purposes, representing application of the presently disclosed hood assembly in a simplified illustration, the dimensions thereof exaggerated for clarity and for a better understanding of the present invention. As such, the presently disclosed hood assembly is by no means limited to the particular structure or layout presented therein. Correspondingly, although the vehicle 10 is depicted in FIG. 1 as a standard coupe-type passenger car, the presently disclosed energy-absorbing hood assemblies can be incorporated into any vehicle platform (e.g., sedan-type passenger cars, light trucks, heavy duty vehicles, buses, vans, etc.)

Figure 3:
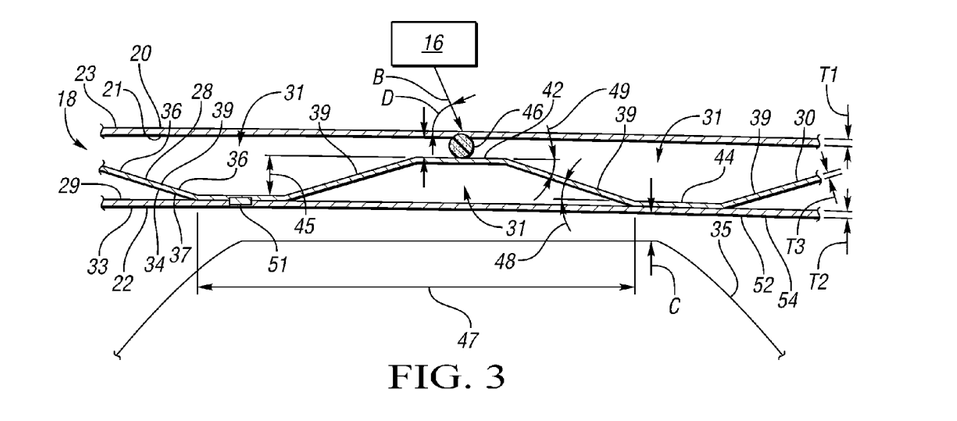
FIG. 3 is a schematic cross-sectional side view of the hood assembly of FIG. 2, taken along section line 3-3 of FIG. 1.

The motor vehicle 10 has a vehicle body 11 (also referred to herein as "vehicle structure") that includes a moveable or actuatable energy-absorbing vehicle hood assembly (hereinafter "hood assembly 14") spanning or covering an engine compartment 12 forward of a passenger compartment 15. The hood assembly 14 is movably attached, coupled, secured, or mounted to the vehicle body 11, for example, by one or more peripheral hinges (not shown) positioned adjacent to a windshield 13. It is desirable that the hood assembly 14 is sufficiently sized and shaped to provide a closure panel suitable for substantially covering and protecting various vehicular components contained within the engine compartment 12, which may include, but is not limited to, propulsion system components, steering system components, braking system components, and heating, ventilation, and air conditioning (HVAC) system components, all of which are represented collectively herein as engine 35 (FIG. 3). The term "engine" or "engine compartment" is not considered limiting with respect to the nature or type of propulsion system employed by the vehicle 10. Thus, the vehicle 10 may employ any propulsion system, such as a conventional internal combustion engine, an electric motor, a fuel cell, a hybrid-electric system, etc. As represented in FIG. 1, vehicle 10 may move or travel in a longitudinal direction of arrow A toward an object 16 (FIG. 3), positioned external to vehicle 10, in such a manner that the object 16 impacts the hood assembly 14 in a substantially downward direction during an impact therebetween, thereby subjecting the hood assembly 14 to various stresses, forces, and/or loads.

Figure 2:
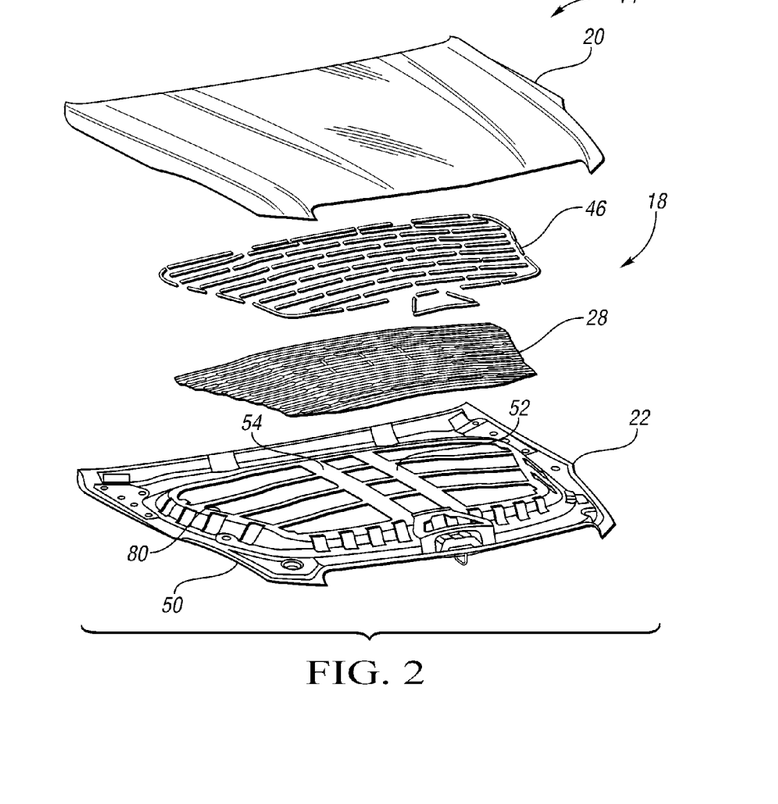
FIG. 2 is a schematic perspective exploded view of a hood assembly of the vehicle shown in FIG. 1, wherein the hood assembly includes first, second, and third panel members.

With reference to FIGS. 1, 2, and 3, the hood assembly 14 includes an inner sandwich structure 18 (hereinafter referred to as the "sandwich structure") including a first or upper panel member 20, a second or lower panel member 22, and a third or middle panel member 28 disposed between the first panel member 20 and the second panel member 22. The first panel member 20 may also be referred to as the first or outer layer. The second panel member 22 may also be referred to as the second or inner layer. The third panel member 28 may also be referred to as the middle layer.

The first panel member 20 may be the outer-most member of the hood assembly 14 and includes a first inner surface 21 and a first outer surface 23 opposite the first inner surface 21. The first inner surface 21 faces toward the engine 35, whereas the first outer surface 23 faces away from the engine 35.

The second panel member 22 may be the inner-most member of the hood assembly 14 and may be substantially flat. In an embodiment, the second panel member 22 includes a second inner surface 29 and a second outer surface 33 opposite the first inner surface. The first inner surface 29 faces away from the engine 35, while the first outer surface toward the engine 35. The second panel member 22 may include a panel portion 50 (FIG. 2) configured to rest on the vehicle body 11 and a support member 52 configured to support the third panel member 28. The support member 52 may be configured as a perforated support plate 54 as discussed in detail below. The support plate 54 may be substantially flat and has a contour that follows the contour of the first panel member 20. In the depicted embodiment, the support member 52 is monolithically formed with the panel portion 50. It is contemplated, however, that the support member 52 may be a discrete component coupled to the panel portion 50. In the embodiment shown in FIG. 2, the third panel member 28 entirely covers the support member 52. Thus, the third panel member 28 entirely covers the support plate 54. The hood assembly 14 and the engine 35 jointly define a clearance C (FIG. 3) between the engine 35 and the second outer surface 33 of the second panel member 22.

The sandwich structure 18 may be wholly or partly made of a metallic material, a polymeric material, or a combination thereof. For example, the first and second panel members 20, 22 may be fabricated from a brittle plastic, such as, but not limited to, Polymethyl methacrylate (PMMA) or bulk mold compound (BMC), of approximately 0.3 to 2.8 millimeters in thickness T1, T2 (FIG. 3), respectively. Alternatively, the first and second panel members 20, 22 may be wholly or partly made from a metal material, such as, but not limited to, cold rolled steel, hot dipped galvanized steel, stainless steel, aluminum, and the like, of approximately 0.3 to 1.5 millimeters in thickness T1, T2. However, other values for the thickness T1 of the first panel member 20, and T2 of the second panel member 22 may be employed.

The first and second panel members 20, 22 may be one-piece structures, such as monolithic plates, which may be pre-formed using methods such as stamping, hydroforming, quick plastic forming, or superplastic forming. Alternatively, the first and second panel members 20, 22 may each be made of multiple interconnected structures such as several plates. The first and second panel members 20, 22 may be individually contoured to meet predetermined packaging, design, and assembly restrictions. For instance, the first panel member 20 may be pre-formed with aesthetically pleasing contours.

With continued reference to FIGS. 2 and 3, the third panel member 28 includes a corrugated body 37 having a third inner surface 34 and a third outer surface 36 opposite the third inner surface 34. The third inner surface 34 faces toward the second panel member 22, whereas the third outer surface 36 faces toward the first panel member 20. The corrugated body 37 has a substantially waveform profile 30 as described in detail below. Accordingly, the corrugated body 37 includes a plurality of peaks or crests 42 and valleys or troughs 44. The waveform profile 30 may have a symmetric or asymmetric polygonal, sinusoidal, or trapezoidal geometry. As used herein, the terms "asymmetric" and "asymmetrical" should be defined or interpreted as identifying a component or element with a geometric profile that is not identical on both sides of a dividing centerline line or plane. Similarly, the term "waveform", as used herein, should be defined or interpreted to mean a repeating, propagating geometric shape having a plurality of peaks and valleys, and corresponding amplitude and wavelength. In the depicted embodiment, the amplitude 45 is a metric of the distance from a peak 42 to a preceding or subsequent valley 44 in a normal direction. The wavelength 47 refers to the distance between repeating units of the waveform profile 30 in the direction parallel to the panel member

20. In addition, the corrugated body 37 defines a plurality of channels 31 between the crests 42 and the valleys 44. A compressible, energy-absorbing foam material (not shown), such as polyurethane foam, polystyrene foam, and other similar materials or combinations thereof, may be utilized to fill the channels 31.

The third panel member 28 is coupled between the first panel member 20 and the second panel member 22. Specifically, the third panel member 28 is coupled to the first inner surface 21 of the first panel member 20. In particular, adhesives 46 may couple one or more crests 46 of the third panel member 28 to the first inner surface 21 of the first panel member 20. One or more substantially rigid connections 51 may couple one or more valleys 44 to the second inner surface 29 of the second panel member 22. As used herein, the rigid connections 51 may include, without limitation, fasteners, such as a rivet or a clinch, or welding such as a spot weld. Alternatively, the entire sandwich structure 18 can be manufactured by extrusion or other molding method in mass production. The quantity and spacing of the rigid connections 51 may be altered in order to control the stiffness of the hood assembly 14.

The third panel member 28 may be a one-piece structure, such as a monolithic plate, pre-formed using such methods as stamping, hydroforming, quick plastic forming, or superplastic forming. The third panel member 28 may be wholly or partly fabricated from a material suitable for use in the hood assembly 14. For example, the third panel member 28 may be wholly or partly made from a plastic polymer (e.g., PMMA or BMC) and may its thickness T3 may range between 1.1 and 1.9 millimeters. Alternatively, the third panel member 28 may be wholly or partly made of a metallic material (e.g., rolled steel, hot dipped galvanized steel, stainless steel, aluminum, and the like) and its thickness T3 may range between about 0.5 and 1.9 millimeters. It is envisioned that the third panel member 28 may be finished with an anti-corrosive, highly durable coating (e.g., as a zinc plating). The third panel member 28 may include multiple interconnected panels, each having a similar or distinct geometric profile.

The third panel member 28 further includes a plurality of intermediate portions 39 (e.g., intermediate layer portion or intermediate panel portion) each interconnecting a crest 42 and a valley 44. Each intermediate portion 39 may be oriented at a first oblique angle 48, such as an acute angle, relative to the valley 44. Similarly, each intermediate portion 39 may be oriented at a second oblique angle 49, such as an acute angle, relative to the crest 42. The first oblique angle 48 may be different from the second oblique angle 49.

The sandwich structure 18 has various structural characteristics, including, but not limited to, geometric characteristics—such as thicknesses T1, T2, T3, amplitude 45, wavelength 47, and first and second oblique angles 48, 49, and material characteristics—such as elastic modulus, yield strength, and density, which may be selectively manipulated to provide a predetermined or "tunable" and substantially constant or uniform impact performance for a given threshold load. As an object 16 impacts the first outer surface 23 of the first panel member 20, the actual and relative mass, velocity, and acceleration of object 16 and vehicle 10 (see FIG. 1) combine to generate a load (represented generally by arrow B) in a generally downward direction, e.g., at an angle D (see FIG. 2). The load B therefore is directed from the first panel member 20 toward the second panel member 22 through the third panel member 28, and has a specific magnitude. Each of the respective panel members 20, 22, and 28 may be independently engineered, by virtue of their individual structural characteristics—i.e., geometric and material characteristics, to have relatively high tensile and compressive strength or stiffness, providing a preferred impact performance when the hood assembly 14 is subjected to load B. The waveform profile 30 defines first and second oblique angles 48, 49 at each propagation that is selectively configured to provide predetermined impact characteristics to the third panel member 28.

With reference again to FIG. 1, the hood assembly 14 is broken up into more than one region. In the depicted embodiment, the hood assembly 14 includes five regions R1-R5. The first R1, second R2, and third R3 regions dissect the hood assembly 14 into a forward region, a middle region, and a rearward region, respectively. In other words, the first region R1 extends from a first or forward edge 17A of the hood assembly 14 to a distance L extending rearward along the vehicle body 11. In addition, the second region R2 extends from the distance L rearward along the vehicle body 11 a further distance M. The third region R3 extends from the distance M (i.e., a distance L+M from the forward edge 17A of the hood assembly 14) to a second or rearward edge 17B, as depicted in FIG. 1. The fourth R4 and fifth R5 regions, if included, further dissect the hood assembly 14 into one or more lateral segments. For example, the fourth region R4 extends inward a distance O from a third or right lateral edge 17C of the hood assembly 14, whereas the fifth region R5 extends inward a distance P from a fourth left lateral edge 17D, also illustrated in FIG. 1. Notably, the dimensions shown in FIG. 1 for regions R1 through R5 are merely exemplary and provided for descriptive purposes, i.e., the length and width of the five regions R1-R5 may vary infinitely. Furthermore, a single region may be utilized or more than five regions may be employed, each having identical or differing geometric configurations.

The sandwich structure 18 (FIG. 2) for each respective region R1-R5 is optimized independently of the other for impact with objects of varying dimensions and masses. For example, the sandwich structure 18 for the first region R1 (shown in FIG. 1) may have an amplitude 45 (FIG. 2) of about 4 mm, a wavelength 74 (FIG. 2) of about 60 mm, a yield strength ranging between 90 and 140 MPa, and a Young's Modulus of about 69 GPa. The second region R2 may have a variable amplitude 45 of less than 6 mm, a variable wavelength 47 of less than 90 mm, a yield strength ranging between 90 and 140 MPa, and a Young's Modulus of about 69 GPa. In addition, the sandwich structure 18 for the third region R3 (shown in FIG. 1) may have an amplitude 45 (FIG. 2) of 8 mm, a wavelength 47 (FIG. 2) of about 80 mm, a yield strength of ranging between 90 and 140 MPa, and a Young's Modulus of about 69 GPa. In addition, the clearance C may be no less than 90 mm. The fourth and fifth regions R4 and R5 preferably have no sandwich structure 18, but rather provide a smooth transition from the regions R1-R3, wherein the first panel member 20 curves at the right and left lateral edges 17C, 17D.

With reference to FIGS. 2 and 3, the sandwich structure 18 is configured to provide sufficient initial stiffness to generate a large initial deceleration as soon and high as possible upon impact with object 16. The sandwich inner structure 18, together with adhesive 46, acts as an added, uniformly-distributed mass to the hood assembly 14.

Figure 4:
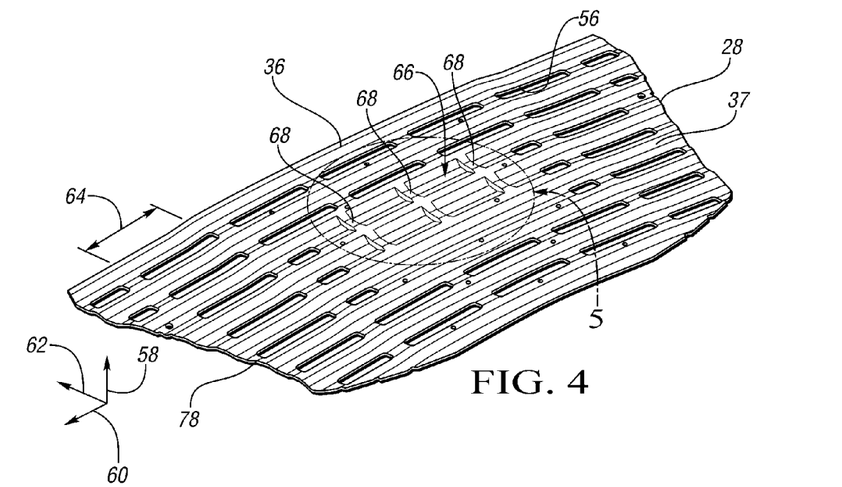
FIG. 4 is a schematic perspective view of the third panel member shown in FIG. 2.

With reference to FIG. 4, the third panel member 28 defines one or more panel perforations 56 (e.g., holes) extending through the corrugated body 37 that alter the stiffness and mass of the third panel member 28 to help control the deceleration of the object 16 when the object 16 impacts the hood assembly 14 as described above. Each perforation 56 may extend through the corrugated body 37 between the third outer surface 36 and the third inner surface 34 (FIG. 3) along a first direction indicated by arrow 58. In the depicted embodiment, one or more panel perforations 56 may be elongated along a second direction indicated by arrow 60. The second direction indicated by arrow 60 may be substantially perpendicular to the first direction indicated by arrow 58. Each perforation 56 defines a length 64. The third panel member 28 may include panel perforations 56 with different lengths 64. The panel perforations 56 may be arranged in rows extending along the third direction indicated by arrow 62. Accordingly, the panel perforations 56 are spaced apart from one another along the third direction 62. Moreover, the panel perforations 56 are also spaced apart from one another along the second direction indicated by arrow 60. The panel perforations 56 may be asymmetrically or symmetrically arranged along the third panel member 28. For example, the panel perforations 56 may be located in the valleys 44 (FIG. 3) and substantially equidistantly from one another. In the depicted embodiment, although some panel perforations 56 are substantially equidistantly from one another, no panel perforations 56 are located in a central panel region 66 of the third panel member 28. The central panel region 66 of the third panel member 28 may be at the same location of the second region R2 (FIG. 1) of the hood assembly 14. It is desirable to omit panel perforations 56 in the central panel region 66 so that the central panel region 66 has a higher stiffness than the rest of the third panel member 28.

Figure 5:
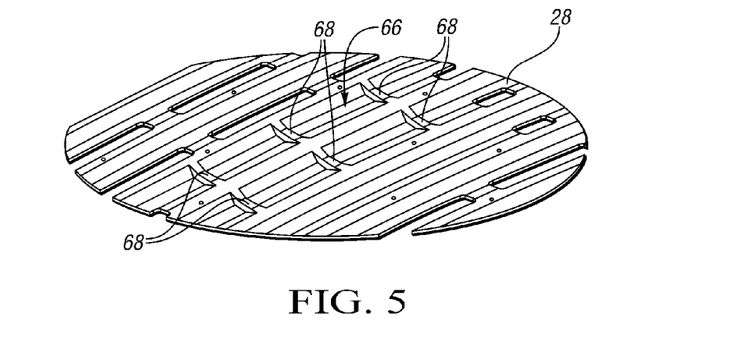
FIG. 5 is an enlarged schematic perspective view of a portion of the third panel member of FIG. 4, taken around section 5 of FIG. 4.

With reference to FIG. 5, in addition to the panel perforations 56, the third panel member 28 may include substantially rigid beads or ribs 68 to adjust the stiffness of the third panel member 28 at a desired location. For instance, in the depicted embodiment, the ribs 68 are disposed in the valleys 44 at the central panel region 66 and are elongated along the third direction indicated by arrow 62. The ribs 68, however, may be disposed at other locations along the third panel member 28.

Figure 6:
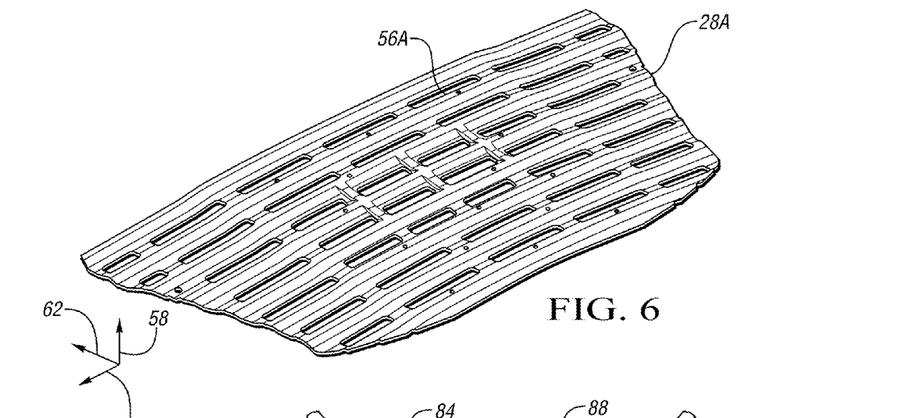
FIG. 6 is a schematic perspective view of a third panel member in accordance with another embodiment of the present disclosure.

FIG. 6 schematically illustrates another embodiment of a third panel member 28A. In this embodiment, the panel perforations 56A are arranged symmetrically along the entire third panel member 28. Hence, all the panel perforations 56A are disposed substantially equidistantly from one another. It is desirable to arrange the panel perforations substantially equidistantly from one another in order to adjust the stiffness of the third panel member 28A.

Figure 7:
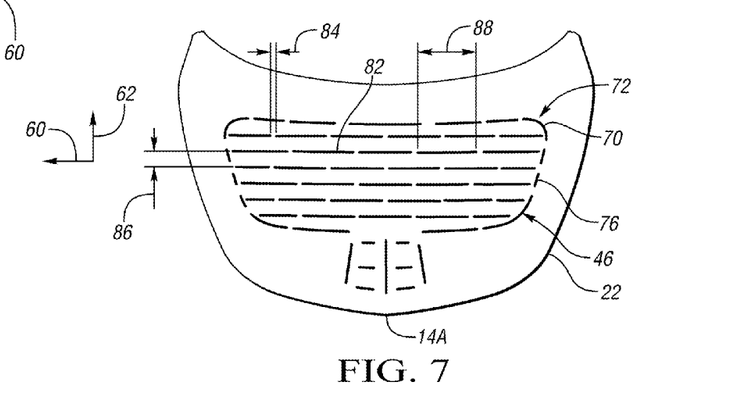
FIG. 7 is a schematic top view of a hood assembly, showing an adhesive distribution in accordance with an embodiment of the present disclosure.

FIG. 7 schematically illustrates an adhesive distribution 72 of the hood assembly 14. As discussed above, suitable adhesive 46 may be used to couple the third panel member 28 to the first panel member 20. It is envisioned, however, that the adhesives 46 may alternatively or additionally be employed to couple the second panel member 22 to the third panel member 28. The adhesives 46 may therefore be located between the second panel member 22 and the third panel member 28. Regardless of its location, The adhesives 46 should exhibit sufficient bonding strength, durability, and resilience for the intended application of the energy-absorbing vehicle hood assembly 14 Suitable adhesives 46 include, but are not limited to, as silicone and acrylic based elastomeric adhesives, polymeric adhesives, and epoxy adhesives. The adhesives 46 may be configured as adhesive strips or beads 70. In embodiment depicted in FIG. 7, the adhesive distribution 72 includes a plurality of adhesive strips 70 defining an outer adhesive periphery 76. The outer adhesive periphery 76 includes a plurality of discrete adhesive strips 70 spaced apart from one another. Further, the outer adhesive periphery 76 may be disposed substantially along (or adjacent to) the third outer periphery 78 (FIG. 2) of the third panel member 28 (FIG. 2) or substantially along (or adjacent to) the second outer periphery 80 (FIG. 2) of the support member 52. The adhesive distribution 72 may further include a plurality of discrete adhesive strips 70 elongated along the second direction indicated by arrow 60 defining a central adhesive distribution region 82. The central adhesive distribution region 82 includes a plurality of adhesive strips 70 spaced apart from each other along the second direction indicated by arrow 60 and the third direction indicated by arrow 62. In particular, the adhesive strips 70 in the central adhesive distribution region 82 may be symmetrically arranged in rows along the second direction indicated by arrow 60. As such, all adjacent adhesive strips 70 may be spaced substantially equidistantly from each other along the second direction indicated by arrow 60 by a first distance 84. The first distance 84 may be substantially the same for all adjacent adhesive strips 70 defining the central adhesive distribution region 82. Moreover, all adjacent adhesive strips 70 may be spaced substantially equidistantly from each other along the third direction indicated by arrow 62 by a second distance 86. Thus, the second distance 86 may be substantially the same for all adjacent adhesive strips 70 defining the central adhesive distribution region 82. Moreover, all the adhesive strips 70 defining the central adhesive distribution region 82 may have substantially similar or identical strip lengths 88.

Figure 8:
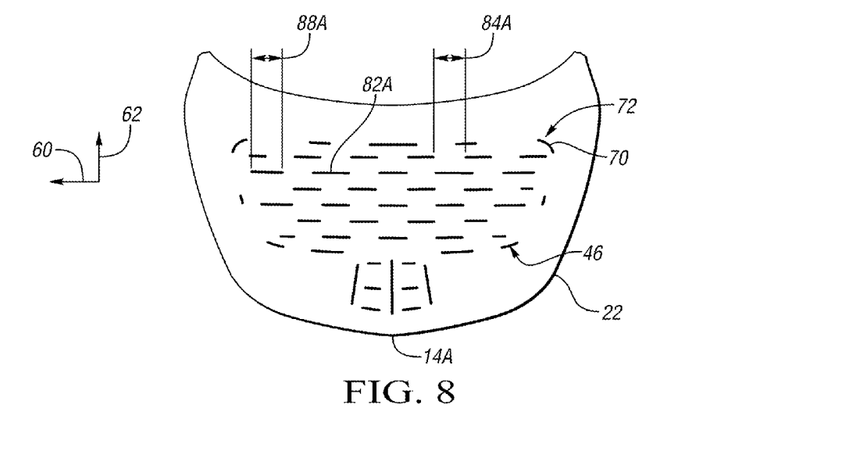
FIG. 8 is a schematic top view of a hood assembly, showing an adhesive distribution in accordance with another embodiment of the present disclosure.

FIG. 8 schematically illustrates an adhesive distribution 72 in accordance with another embodiment of the present disclosure. The adhesive distribution 72 is similar to the adhesive distribution 72 show in FIG. 7. However, the first distance 84A between adjacent adhesive strips 72 in this embodiment is larger than the first distance 84 in the embodiment shown in FIG. 7. Also, strip length 88A of the adhesive strips 70 in this embodiment is smaller than the strip length 88 in the embodiment shown in FIG. 7. Overall, the adhesive distribution 72 has more adhesive 46 than the adhesive distribution 72 shown in FIG. 7. It is desirable to adjust the first distance 84A, the strip length 88A, and quantity of adhesive 46 in order to adjust the stiffness of the hood assembly 14. The placement and quantity of the adhesives 46 may be controlled in order to adjust the stiffness of the hood assembly 14.

Figure 9A:
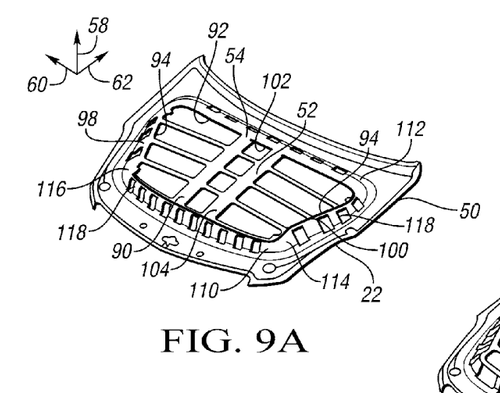
FIG. 9A is a schematic perspective view of the second panel member and a support plate of the hood assembly of FIG. 1 according to an embodiment of the present disclosure.

With reference to FIG. 9A, the second panel member 22 includes the panel portion 50 and the support member 52 as discussed above. The support member 52 may be monolithically formed with, or coupled to, the panel portion 50. The panel portion 50 includes a front wall 110, a rear wall 112, a first lateral wall 114, and a second lateral wall 116. Further, the panel portion 50 may include one or more holes 118 (e.g., perforations) extending through the front wall 110, the rear wall 112, the first lateral wall 114, and/or the second lateral wall 116 in order to adjust the stiffness of the second panel member 22. The support member 52 may be a perforated support plate 54. As such, the support member 52 may be substantially flat and includes a support body 90. The support member 52 defines one or more support perforations 92 (e.g. holes) extending through the support body 90 along the first direction indicated by arrow 58. In other words, the support perforations 92 extend through the support plate 54. The support perforations 92 affect the stiffness and mass of the hood assembly 14 and therefore help control the deceleration of the object 16 when the object 16 impacts with the hoods assembly 14. In the embodiment depicted in FIG. 9A, the support perforations include lateral support perforations 94 and central support perforations 102. The lateral support perforations 94 are adjacent the first and second lateral edges 98, 100 of the support member 52 and may be elongated along the second direction indicated by arrow 60. Further, the lateral support perforations 94 may be arranged in one or more rows and may be spaced apart from one another along the first direction indicated by arrow 62. Aside from the lateral support perforations 94, the support perforations 92 include central support perforations 102 located at a central support region 104 of the support member 52. The central support perforations 102 may be located between two rows of lateral support perforations 94 and may have a different size than the lateral support perforations 94. For instance, the lateral support perforations 94 may be larger than the central support perforations 102.

Figure 9B:
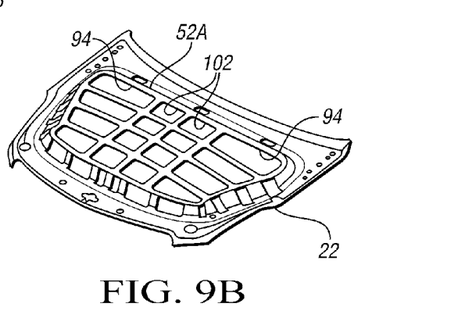
FIG. 9B is a schematic perspective view of a second panel member and a support plate of the hood assembly of FIG. 1 according to another embodiment of the present disclosure.
Figure 9C:
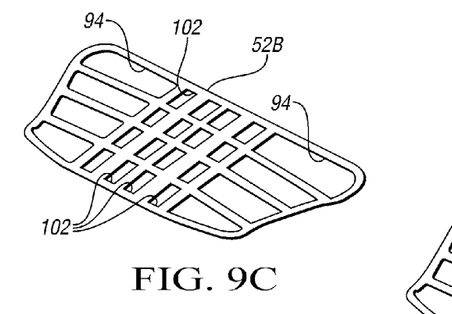
FIG. 9C is a schematic perspective view of a support plate of the hood assembly of FIG. 1 in accordance with an embodiment of the present disclosure.
Figure 9D:
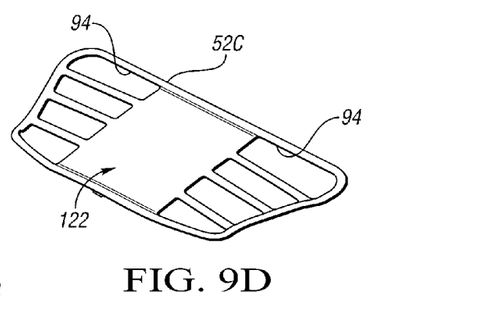
FIG. 9D is a schematic perspective view of a support plate of the hood assembly of FIG. 1 in accordance with an embodiment of the present disclosure.
Figure 9E:
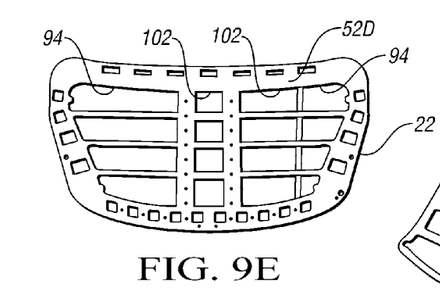
FIG. 9E is a schematic perspective view of a support plate of the hood assembly of FIG. 1 according to an embodiment of the present disclosure.
Figure 9F:
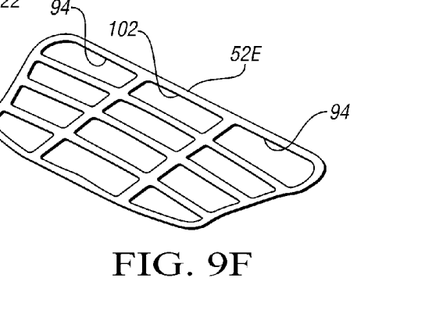
FIG. 9F is a schematic perspective view of a support plate of the hood assembly of FIG. 1 according to another embodiment of the present disclosure.

In the embodiment shown in FIG. 9A, the central support perforations 102 are arranged along one row extending in the first direction indicated by arrow 62. However, it is envisioned that the central support perforations 94 may arranged in more than one row. For instance, in the embodiment depicted in FIG. 9B, a support member 52A defines two rows of central support perforations 102. Further, in the embodiment depicted in FIG. 9C, a support member 52B defines four rows of central support perforations 102. Alternatively, in FIG. 9D, a support member 52C only includes two rows of lateral support perforations 94, and the support member 52c does not define central support perforations 102. Thus, the support member 52C may include a central support region 122 without support perforations 92 or holes. Moreover, the central support perforations 102 and the lateral support perforations 94 may have different sizes. For instance, in the embodiment shown in FIG. 9E, a support member 52D includes central support perforations 102 having different sizes. However, in the embodiment shown in FIG. 9F, a support member 52E includes central support perforations 102 and lateral support perforations 94 having substantially similar or identical sizes.

Figure 10:
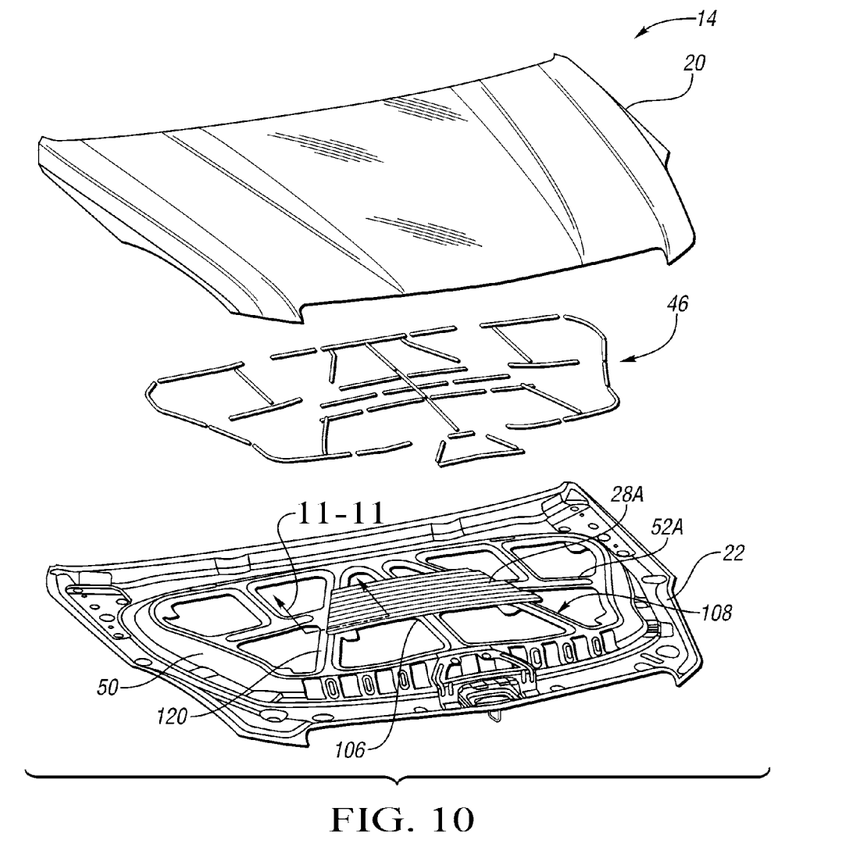
FIG. 10 is a schematic perspective exploded view of a hood assembly in accordance with an embodiment of the present disclosure.
Figure 11:
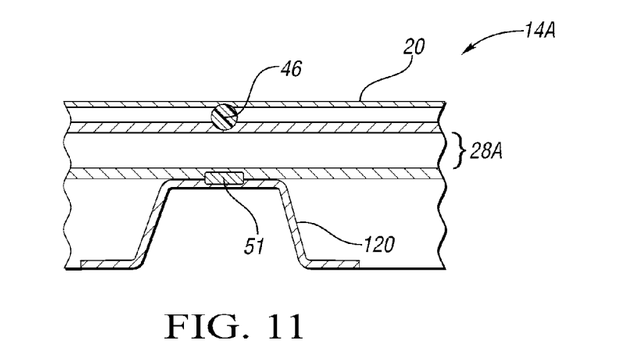
FIG. 11 is a schematic cross-sectional view of the hood assembly of FIG. 10, taken along the section line 11-11.

With reference to FIGS. 10 and 11, the hood assembly 14A is substantially similar to the hood assembly 14 shown in FIG. 2 and thus includes the first panel member 20 and the second panel member 22. However, the hood assembly 14A includes a different third panel member 28A and a different support member 52A. The structure and operation of the third panel member 28A is substantially similar to the third panel member 28 (FIG. 2) but the third panel member 28A does not cover the entire support member 52A. Rather, the third panel member 28A only partially covers the support member 52A. In the embodiment depicted in FIG. 10, the third panel member 28A only covers a central support region 106 of the support member 52A. It is nonetheless contemplated that the third panel member 28A may alternatively or additionally cover other regions of the support member 52A.

With continued reference to FIGS. 10 and 11, the support member 52 includes a beam assembly 108 rather than a flat plate. The beam assembly 108 includes a plurality of beams 120 coupled to, or monolithically formed with, the panel portion 50. Each beam 120 may define a substantially trapezoidal cross-section as shown in FIG. 11 and may be referred to as an inverted beam. It is nonetheless contemplated that the beams 120 may have other suitable cross-sectional shapes. For instance, the beams 120 may have an I-shaped cross-section. Irrespective of its cross-sectional shape, the beams 120 are configured to support the third panel member 52A. As discussed above, in the embodiment shown in FIGS. 10 and 11, the third panel member 28A covers only a portion of the support member 52A. However, it is envisioned, that the third panel member 28 (FIG. 2) may be disposed over the entire support member 52A. Accordingly, the third panel member 28 (FIG. 2) would cover the entire support member 52.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle hood assembly, comprising:
a first panel member;
a second panel member; and
a third panel member disposed between the first panel member and the second panel member, the third panel member including a corrugated body; and
wherein the third panel member defines a plurality of panel perforations extending through the corrugated body;
wherein the second panel member includes a support plate configured to support the corrugated body, and the support plate defines a plurality of support perforations extending through the support plate.

2. The vehicle hood assembly of claim 1, wherein the panel perforations are substantially equidistantly spaced apart from one another.

3. The vehicle hood assembly of claim 1, wherein the third panel member includes a central panel region without panel perforations.

4. The vehicle hood assembly of claim 3, wherein the third panel member includes ribs to enhance stiffness of the third panel member.

5. The vehicle hood assembly of claim 4, wherein the ribs are located in the central panel region.

6. The vehicle hood assembly of claim 1, wherein the second panel member includes a panel portion coupled to the support plate and defines a plurality of holes extending through the panel portion.

7. The vehicle hood assembly of claim 6, wherein the second panel member includes a central support region without holes.

8. The vehicle hood assembly of claim 1, wherein the second panel member includes a panel portion monolithically formed with the support plate and defines a plurality of holes extending through the panel portion.

9. The vehicle hood assembly of claim 1, wherein the third panel member entirely covers the support plate.

10. The vehicle hood assembly of claim 1, wherein the third panel member only partially covers the support plate.

11. The vehicle hood assembly of claim 1, wherein the support plate is substantially flat.

12. The vehicle hood assembly of claim 1, wherein the second panel member includes a plurality of beams configured to support the corrugated body.

13. A vehicle comprising:
a vehicle body;
a hood assembly movably coupled to the vehicle body, the hood assembly defining a first edge and a second edge opposite the first edge, the hood assembly including:
a first panel member;
a second panel member;
a third panel member coupled between the first panel member and the second panel member, the third panel member including a corrugated body, the corrugated body defining a waveform profile propagating in a longitudinal direction from the first edge toward the second edge;
wherein the third panel member defines a plurality of panel perforations extending through the corrugated body; and
wherein the second panel member includes a substantially flat support plate configured to support the corrugated body, and the second panel member defines a plurality of support perforations extending through the support plate.

14. The vehicle of claim 13, wherein the support plate includes a central support region without support perforations.

15. The vehicle of claim 13, wherein the third panel member entirely covers the support plate.

16. The vehicle of claim 13, wherein the third panel member only partially covers the support plate.

17. The vehicle of claim 13, wherein the support perforations have different sizes.

18. The vehicle of claim 13, further comprising adhesive strips coupling the first panel member to the third panel member.

19. A vehicle hood assembly, comprising:
a first panel member;
a second panel member;
a third panel member disposed between the first panel member and the second panel member, the third panel member including a corrugated body;
a plurality of adhesive strips coupling the first panel member to the third panel member; and
wherein the third panel member defines a plurality of panel perforations extending through the corrugated body.

20. The vehicle hood assembly of claim 19, wherein the second panel member includes a support plate configured to support the corrugated body.

* * * * *